United States Patent Office 2,837,871
Patented June 10, 1958

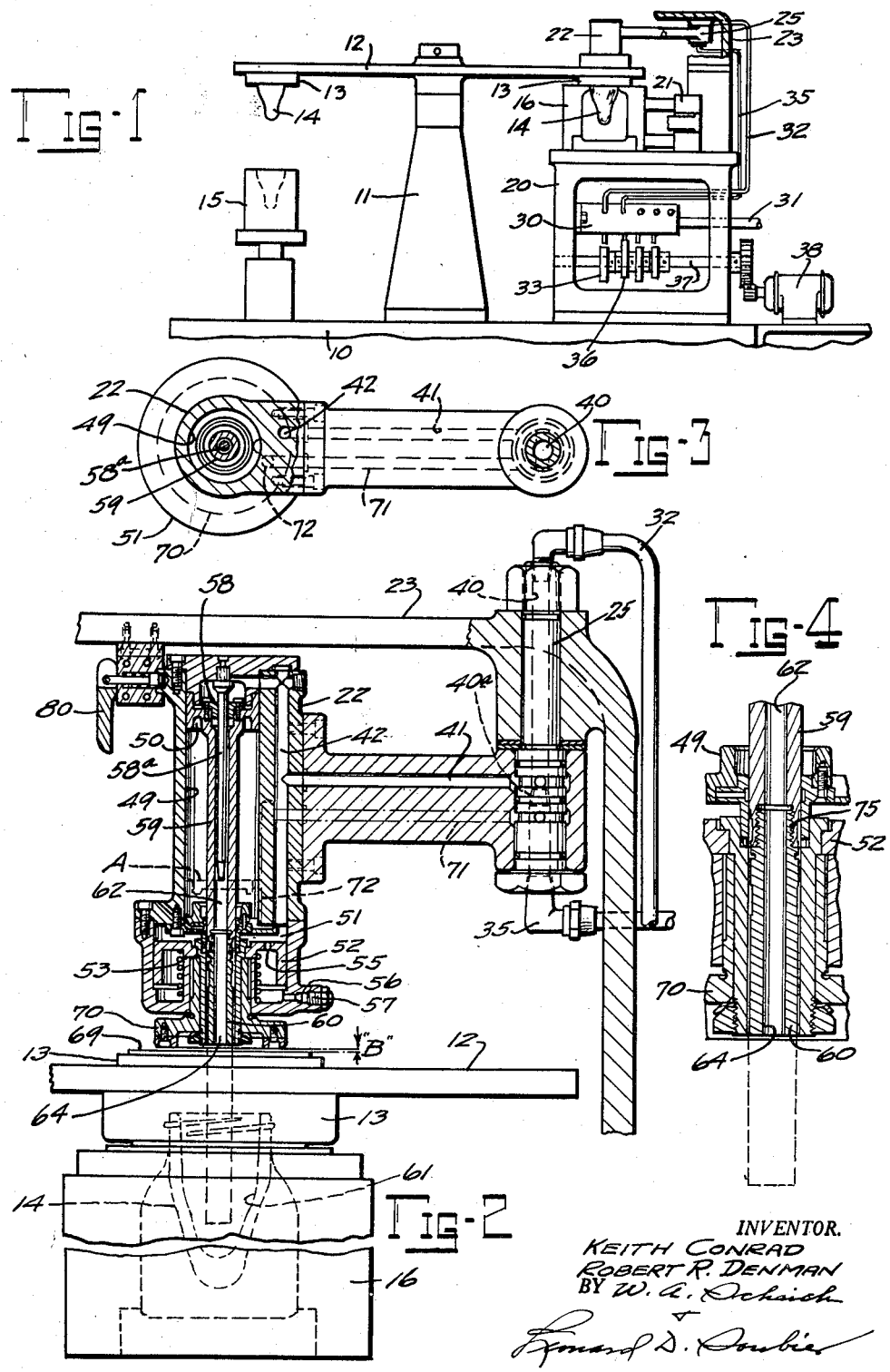

2,837,871

GLASS BLOWING DEVICE

Keith Conrad, Toledo, and Robert R. Denman, Columbus, Ohio, assignors to Owens-Illinois Glass Company, a corporation of Ohio Application November 1, 1954, Serial No. 465,814

3 Claims. (Cl. 49—18)

Our invention relates to glass forming devices and in particular to a device for supplying blowing air for the expansion of formed glass parisons either of the pressed type or of the blown type. Among the objects of this invention is to provide a blow head mechanism which is so designed as to adapt itself to any mechanical irregularities which may exist in the forming mechanism.

A further object is to provide a type of mechanism which may control the application of the blowing air in the expansion of the hollow glass parison and another object is to provide a mechanism which may be easily adapted for interchange of parts.

Referring to the drawings, Fig. 1 is a diagrammatic elevational view showing a glass forming mechanism to which this invention is applied.

Fig. 2 is a cross sectional elevation through this blowing mechanism.

Fig. 3 is a sectional plan view showing the air passages and connections for this blow head and Fig. 4 is a part sectional elevation of the blowing nozzle.

Referring in particular to Fig. 1, there is shown a glass forming machine comprised of a base 10, a center column 11, and a table 12 adapted to support one or more neck forming molds 13. This table 12 may be adapted for rotation about the center line of the column 11 to move the molds 13 with their formed parisons 14 from the blank forming mold station 15 into the confines of a blowing mold 16. The blowing mold 16 is stationary so far as rotation is concerned and is mounted upon a base structure 20. Blow mold 16 is of the usual split type and hinged about the post 21 for opening and closing movement. The blowing head unit 22 is mounted on a vertical standard 23 and adapted to be manually swung to and from operating position about a fulcrum 25.

Mounted in the base structure 20 is a fluid accumulating chamber 30 which is supplied with fluid under pressure from a main line 31 and from which a series of conduits lead to the various operating mechanisms. In this instance, air is supplied to the cylinder blowing head unit 22 through a line 32 which is adapted for opening closed by a cam 33. Air or fluid to the other end of the cylinder unit 22 is provided through line 35 which in turn is controlled by a cam 36. Cams 33 and 36 are mounted on a shaft 37 which is driven through a motor unit 38.

Referring in particular to Fig. 2, air from the line 32 passes down through the conduits 40 and 41 into the vertical conduit 42 which supplies air to the top end of the cylinder 49 and piston 50. Also, air from the same conduit 42 passes down and enters into the cylinder 51 above the piston 52.

A spring 53 normally acts to hold the piston 52 in its upper position in the cylinder 51 but as the air pressure from conduit 42 enters into the cylinder 51 above the piston, it tends to compress the springs 53, such compression dependent upon the amount of leakage provided by a small opening 55 in piston 52 and the additional leakage from cylinder 51 permitted through opening 56 by a needle valve 57. The adjustment of needle valve 57 permits a balancing of the active air pressure on the opposite sides of baffle 70 and piston 52 to thereby permit control of the exhaust of the blowing air from the inside of the blown ware and also the control of the ware temperature.

As the air continues to pass through the conduit 42 to the top end of piston 50 in cylinder 49, the piston will be caused to move downwardly and project the piston rod 59 and blowing tube 60 attached thereto, into the hollow portion 61 of the parison 14. As the piston 50 reaches its downward position as indicated by the dotted lines at A in Fig. 2, air will enter through the conduit 62 of the piston rod 59 and thence through the opening 64 in the blowing tube 60. This entrance of air into conduit 62 in the piston rod 59 is controlled by the stripping of the bushing 58 from the pin 58a thus permitting the air to enter said conduit 62 when the piston 50 has approximately reached its down position. Likewise the air to conduit 62 is shut off when the piston 50 moves up. As the air under pressure, leaves the opening 64 it expands the parison 14 to the inner shaped confines of the mold 16 and then this air under pressure flows upward along the inside walls of the blown article and thence against the baffle head 70 formed on the lower end of the piston 52. This back pressure of air maintains this baffle 70 slightly lifted and prevents it from positively seating on the top surface of the neck mold 13. This eliminates the need for any great degree of accuracy between the top surface 69 of the neck mold 13 and the lower surfaces of the baffle 70.

In normal operation the baffle 70 never actually seats upon the surface 69 of the neck mold 13 and there is always provided an air escape gap B as shown in Fig. 2.

When the bottle is blown to final form the cam 36 actuates an air control valve and permits air to enter through conduits 35, 71 and 72 to the lower end of cylinder 49 and beneath the piston 50. This air under pressure will raise the piston 50 to the position shown in Fig. 2 and withdraw the blowing member 60 from the confines of the blowing mold and the neck mold.

Thus, as the table 12 rotates it brings each successive neck mold 13 to the blowing station where because of the floating baffle 70 there is no necessity for having the top surface of the neck molds 13 in any exact horizontal plane with respect to the baffle 70 or the blow head 22. It will be noted that during the blowing operation there is no actual physical contact as between the members of the blowing head unit and the neck mold 13 or the parison 14.

The blowing member 60 is threaded into the piston 63 as at 75 and is interchangeable therein, in order to provide blowing tubes of the required lengths and diameters.

The blow head assembly 22 may be manually moved out of operative position by releasing the spring detent 80 and swinging the head about the shaft 25.

Modifications may be resorted to within the spirit and scope of our invention.

We claim:

1. A parison blowing device comprising in combination, a blow head baffle, a piston movable with said baffle, a piston rod providing attachment between said piston and said baffle, a spring adapted to contact the lower end of said piston and hold said baffle and piston in a non-blowing position, means to supply fluid pressure to the top of said piston, a metering orifice in the top of said piston adapted to permit leakage of said fluid pressure through said piston in metered quantity to permit lifting of said baffle, a neck and blow mold adapted to support a parison in blowing position with respect to said blow head and baffle, means to supply blowing air to the inside of said parison and beneath said baffle, and means to regulate the rate of flow of said top pressure fluid through said metering orifice to thereby control the amount of lift of said baffle.

2. A parison blowing device comprising in combination, a blow head baffle, a piston movable with said baffle, a piston rod providing attachment between said piston and said baffle, a spring adapted to normally hold said baffle and piston in a non-blowing position, means to supply fluid pressure to the top of said piston, a fluid metering orifice in the upper end of said piston to permit leakage of said fluid pressure through said piston in metered quantity, a cooperating neck and blow mold adapted to support a hollow parison in blowing position beneath said blow head and baffle, an elongated nozzle movable into said parison and adapted to supply blowing air to the inside of said parison, and means to regulate the rate of flow of said pressure fluid through said metering orifice to thereby control the lift of said baffle.

3. A parison blowing device comprising in combination, a blow head baffle, a piston movable with said baffle, an interconnecting rod attachment between said piston and said baffle, a spring adapted to hold said baffle and piston in a non-blowing position, means to supply fluid pressure to the top of said piston, metering means to permit leakage of said fluid pressure through said piston in a metered quantity, a neck and blow mold adapted to support a hollow parison in blowing position with respect to said blow head and baffle, an elongated reciprocable nozzle adapted to supply blowing air to the inside of said parison, and means to regulate the rate of flow of said top pressure fluid through said metering means to thereby control the lift of said baffle.

References Cited in the file of this patent

UNITED STATES PATENTS

| 1,647,532 | Lorenz | Nov. 1, 1927 |
| 1,818,725 | Lorenz | Aug. 11, 1931 |
| 1,854,471 | Hofmann | Apr. 19, 1932 |
| 2,123,145 | Peiler | July 5, 1938 |

FOREIGN PATENTS

| 310,421 | Great Britain | Feb. 27, 1930 |